United States Patent [19]
Davis et al.

[11] 3,852,957

[45] Dec. 10, 1974

[54] FUEL VALVE CONTROL AMPLIFIER

[75] Inventors: James L. Davis; Edward L. Lopke, both of Kokomo, Ind.

[73] Assignee: General Motors Corporation, Detroit, Mich.

[22] Filed: Aug. 6, 1973

[21] Appl. No.: 385,952

[52] U.S. Cl. ........................................... 60/39.28 R
[51] Int. Cl. .............................................. F02c 9/08
[58] Field of Search ................ 60/39.28 R, 39.38 T

[56] References Cited
UNITED STATES PATENTS

| | | | |
|---|---|---|---|
| 2,841,336 | 7/1958 | Martin | 60/39.28 T |
| 3,045,426 | 7/1962 | Brahm | 60/39.28 T |
| 3,153,322 | 10/1964 | Addrison | 60/39.28 R |
| 3,478,512 | 11/1969 | Brahm | 60/39.28 R |
| 3,533,236 | 10/1970 | Cottington | 60/39.28 R |

*Primary Examiner*—Clarence R. Gordon
*Attorney, Agent, or Firm*—Paul Fitzpatrick

[57] ABSTRACT

An amplifier for use in a control system for a gas turbine engine receives an input potential signal indicative of request for engine power level and delivers a current which is varied to control a fuel metering system for the engine. The current delivered by the amplifier varies linearly with the input over two contiguous ranges, with the ratio of increase of output current to increase in input voltage substantially higher over the portion of the range corresponding to higher engine output than over the portion of the range corresponding to lower engine output. This change in gain of the amplifier causes its output to parallel approximately the generally parabolic curve of required engine fuel flow against engine speed. The amplifier includes a first stage which maintains the drop across a fixed resistor proportional to the controlling input potential over the lower power range. It includes a connection through a diode to a voltage divider energized from a controlled potential source to cause the current through the resistor to be partially shunted above the particular level of current representing the break in the output characteristic. The current flow through the first stage of the amplifier is multiplied in a power amplifier which drives the fuel metering valve.

4 Claims, 2 Drawing Figures

PATENTED DEC 10 1974  3,852,957

FUEL VALVE CONTROL AMPLIFIER

Our invention relates to controls for gas turbine engines, and particularly to an amplifier adapted to translate a potential signal indicative of the desired engine power or speed level into a current signal suitable to operate a solenoid operated valve which controls the flow of fuel to the engine.

The control of gas turbine engines usually primarily involves control of fuel supplied to the engine so as to secure the desired engine output and to avoid hazardous or unsatisfactory conditions such as overspeed, overtemperature, surge, stall, flameout, and so on, in the engine, as is well understood by those skilled in the art. Control of fuel is a function primarily of two things; what is desired from the engine and the amount of fuel the engine can handle under its existing conditions of operation.

At one time, most gas turbine fuel controls were primarily hydromechanical devices, but there has been increasing interest in controls which are largely electrical because of the compactness, flexibility, economy, and reliability of electronic devices. With such controls, however, there must be some means to convert an electrical signal of some sort into a fuel flow as, for instance, by operating a valve.

Our present invention is concerned with a power amplifying device which is suited to the characteristics of such engines and is adapted to provide a current signal to a fuel flow regulating valve dependent upon a potential signal which is the result of the combination or selection of various inputs to an electrical or electronic fuel control system.

Our invention is not concerned with the elements of the fuel control system which determine what the signal to the amplifier may be, since these devices may be of various sorts and respond to various parameters or conditions of ambient pressure, temperature, engine speed, and so on, and the details or selection of such are not significant to the present invention.

The principal object of our invention is to provide an amplifier which is suited to providing a driving signal to a gas turbine fuel controlling system based upon an input signal from electronic fuel controls. A further object is to provide such a system which has a change in gain of the amplifier between two ranges of operation generally consonant with the engine characteristic of fuel flow against engine speed.

A further object of the invention is to provide such an amplifier which is capable of precise operation while energized from an unregulated and variable source of power.

The nature of our invention and the way in which these objects are accomplished will be clear to those skilled in the art from the succeeding detailed description of the preferred embodiment of the invention and the accompanying drawings.

Figure 1:
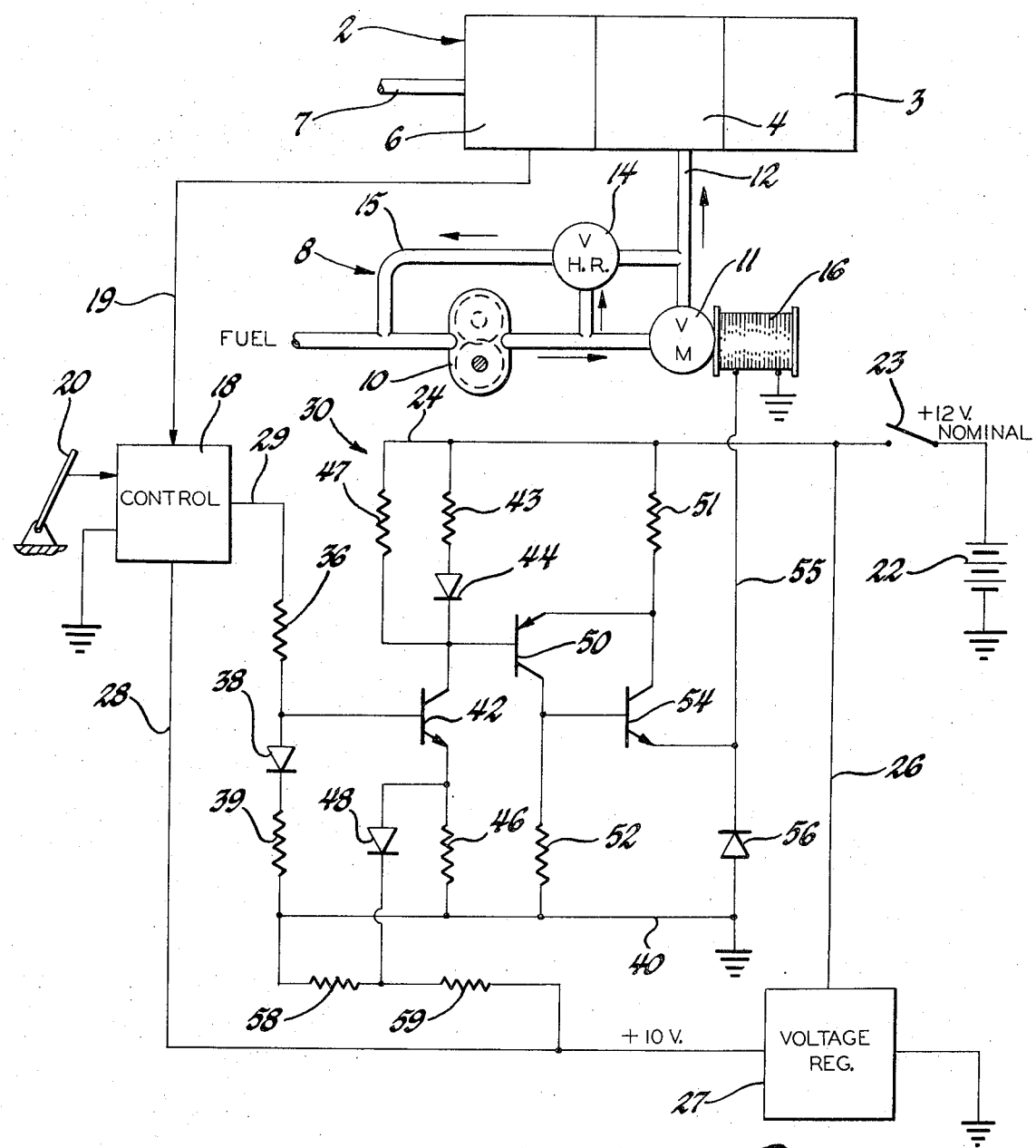
FIG. 1 is a schematic diagram of a gas turbine engine fuel control system embodying the invention.

Referring first to FIG. 1, the environment and application of our amplifier may be explained as follows: A gas turbine engine 2 may be of conventional type including a compressor 3, combustion apparatus 4, and a turbine or turbines 6 which drive the compressor and drive a power output shaft 7. Fuel is supplied to the combustion apparatus 4 and burned in the discharge from the compressor to provide the motive fluid for the turbine or turbines 6.

The fuel supply system 8 for the engine may include a pump 10, supplied with fuel from any suitable source such as a boost pump or fuel tank, which delivers the fuel to a metering valve 11 from which the fuel flows through a conduit 12 to the combustion apparatus. A head regulating valve 14 by-passes excess fuel delivered by the pump through a return line 15 to the pump inlet. This valve responds to the difference between the pressures upstream and downstream of the metering valve and may maintain a constant head or may have some additional input to vary the metering head as desired. The metering valve 11 is indicated as being controlled by a solenoid 16, it being assumed that if current in the solenoid is increased, the metering valve is opened further to deliver more fuel to the engine. The fuel system 8 may be regarded as a schematic showing of various known fuel systems such, for example, as that described in U.S. Pat. No. 3,732,039 of Carothers, May 8, 1973.

Supply of fuel to the engine 2 is regulated by a control system 18 which receives inputs indicative of ambient and engine conditions as indicated schematically by the line 19 leading from the engine to the control. Such inputs may be inputs of ambient temperature or pressure, compressor discharge pressure, engine (or gas generator) revolutions per minute, or turbine inlet temperature, for example. The nature of these inputs from the engine to the control are immaterial to our invention. Likewise, the control might control other conditions of the engine than fuel, but these are immaterial to our present invention.

The control system 18 also receives a power level or speed input from an operator operable control 20 which might be the accelerator pedal of a vehicle. The control 20 calls for the desired power level of engine operation and the control system 18 translates this signal and the other inputs to the control into an output determinative of fuel supply.

The system is energized from any appropriate power source, here shown as a storage battery 22 of a motor vehicle, the charging circuit and the other circuits to which it supplies power not being indicated. In the particular embodiment, the battery supplies power at a nominal +12 volts through a switch 23 to the power bus 24. It also supplies power through a lead 26 to a voltage regulator or regulated power supply device 27 which, in the system described, delivers a relatively small amount of power at a closely regulated +10 volt level. Some of this power is supplied to the control system 18 through a lead 28.

Figure 2:
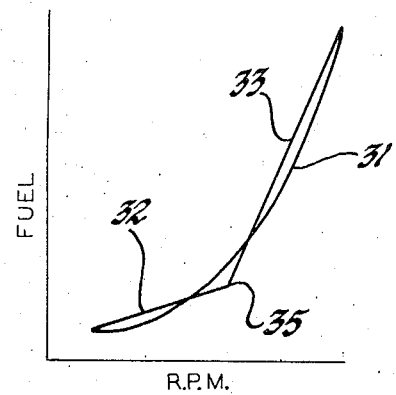
FIG. 2 is a graph illustrating the cooperation of the amplifier with the engine.

So far as our present invention is concerned, the only relevant function of control system 18 is to deliver a small current at a potential which is varied to indicate the desired rate of supply of fuel to the engine. This controlling or input emf is delivered by the control system 18 to a line 29 providing the inputs to the amplifier 30. The input or voltage on line 29 may be considered as approximating an rpm signal for the engine 2. Referring briefly to FIG. 2, the steady state consumption of fuel as a function of revolutions per minute of a freely rotating turbine, such as the gas generator turbine of a gas turbine engine, is illustrated generally by the curve 31. As will be seen, this curve is of a generally parabolic nature, rising slowly and then more steeply as speed increases.

The straight lines 32 and 33 represent the relation of current output of our amplifier to potential input. The curve has a relatively small gain along line 32 and a rather large gain along line 33. This represents a change in gain of the amplifier at the point 35. As will be seen, the two straight lines approximate the curve 31. For best results, the point at which the gain changes should be rather precisely fixed.

With this introduction, we may proceed to the detailed description of the preferred embodiment of our amplifier 30. It may be pointed out that various components are identified and the values of elements of the circuits are specified, but that such information is provided only for completeness of disclosure and to facilitate practice of the invention. As will be recognized by those skilled in the electronic arts, such values may be varied to adapt the amplifier to various systems and engines and to incorporate changes in available components and profit by advances in the electronic arts. They are not presented as limiting the invention.

The input potential signal on line 29 is connected through a series circuit of resistor 36 (5.1 kilohms), diode 38, and resistor 39 (3.9 kilohms) to a ground line or bus 40.

The junction of resistor 36 and diode 38 is connected to the base of an NPN transistor 42. This transistor is in a circuit from the 12 volt bus through resistor 43 (200 ohms), diode 44, collector and emitter of the transistor, and resistor 46 (750 ohms) to ground. Diodes 38 and 44 are Delco Service No. 31 and the transistor is Delco Service No. 67. The forward potential drop through diode 38 equals the base-emitter drop of transistor 42 when the transistor is conducting, so that the former compensates for the latter. It will be seen, therefore, that the potential across resistor 46 equals that across resistor 39. Also, the drop through resistor 39 is proportional to the potential on line 29 less the constant drop across diode 38. Thus, as potential on line 29 increases, the potential on the base of transistor 42 increases linearly with it, and current will flow through the transistor to maintain the drop across resistor 46 equal to that across resistor 39.

Therefore, the current through resistor 46 is a linear function of the drop through resistor 39 and of the potential on line 29. Resistor 43 and diode 44 are shunted by a resistor 47 (30 kilohms) which is of sufficiently high value that it has no significant effect on this relation. It serves to handle transistor leakage current. The diode 48 (Delco Service No. 31) is not conducting over the lower rpm range of operation indicated by line 32 in FIG. 2, and will not now be considered. The increase in current through resistor 46 also increases correspondingly the current in and the potential drop across resistor 43. This drop plus the drop across diode 44 is communicated to the base of a PNP transistor 50 (Delco Service No. 83) the emitter of which is connected to the 12 volt bus by a resistor 51 of 10 ohms, 1 watt rating. The collector of transistor 50 is connected to ground by 2 kilohm resistor 52.

The emitter-base drop of transistor 50 is equal to the forward drop of diode 44 so this also is a compensating feature. Resistor 51 is also connected to the collector of NPN transistor 54 (similar to type 2N3055), the emitter of which is connected to the amplifier output line 55 and thus through valve-operating solenoid 16 to ground. The base of transistor 54 is connected to the collector of transistor 50. When the drop across resistor 43 turns on transistor 50 by base drive, the current through this transistor creates a drop in resistor 52 which turns on the power output transistor 54, completing a circuit through resistor 51 and the solenoid 16. Since the drop from emitter to base of transistor 50 equals the drop of diode 44, the potential drops in resistors 43 and 51 are maintained equal and therefore current through resistor 51 is maintained at twenty times that through resistor 43, providing sufficient current for operation of a solenoid valve. The amount of current flowing through solenoid 16 is therefore a linear function of potential on line 29. A diode 56 (Delco Service No. 79) is connected from ground to the output line 55 to discharge kickbacks caused by deenergization of the inductive load of solenoid 16 when the system is turned off.

We have now seen how the amplifier provides the output corresponding to line 32 of FIG. 2. For the higher gain output corresponding to line 33, the circuit through diode 48, previously mentioned, becomes effective. The cathode of this diode is connected to ground through a resistor 58 (330 ohms) and to the regulated 10 volt supply through resistor 59 (2,200 ohms). With no current, the cathode of this diode is maintained at approximately 1.25 volts by the voltage divider 58, 59. Therefore, when the potential on the anode of this diode reaches approximately 1.8 volts, the diode conducts, providing a circuit through diode 48 and resistor 58 shunting resistor 46 and thus increasing the ratio of current through resistor 43 to that through resistor 39. Current flow through resistor 43, diode 44, and transistor 42 must have a greater increment to cause equal increments of voltage drop across resistor 46. As a result, the current flow through transistor 42 and resistor 43 is a steeper function of potential on line 29, as is reflected in the output characteristic indicated by the straight line 33 in FIG. 2. Since the transition point 35 is fixed by the regulated voltage, it is not influenced in any significant way by changes in the unregulated voltage with which the amplifier is supplied. By the nature of the amplifier, changes in potential have very little effect on the relation expressed above, as will be apparent.

Therefore, it will be seen from the foregoing that the current fed to solenoid 16 is a function of the potential on line 29 as indicated by the line 32, 33 in FIG. 2 and the fuel supplied to the engine will reflect the signal on line 29 accurately. The constant potential source 27 could if desired be a part of our amplifier; for example, it could be simply a Zener diode fixing the potential across resistors 58 and 59.

The detailed description of the preferred embodiment of the invention for the purpose of explaining the principles thereof is not to be considered as limiting or restricting the invention, since many modifications may be made by the exercise of skill in the art.

We claim:

1. An amplifier for use in a fuel control system for a gas turbine engine including a control system providing an electric potential signal indicative of requested engine power level and including fuel metering means responsive to the magnitude of an electric current for regulating fuel flow to the engine, the amplifier comprising, in combination, a first amplifier stage having a controlling potential input from the said potential signal and having a first resistor in its output circuit, effective to maintain potential across the resistor and thus current in the output circuit at a first ratio to the potential signal over a first range of operation corresponding to a lower range of requested power level; a voltage divider energized from a source of constant potential; unidirectional conducting means connecting the output circuit to the voltage divider so that the first resistor is shunted by a portion of the voltage divider above a predetermined potential across the first resistor to maintain current in the output circuit at a second and higher ratio to the potential signal over a second range of operation corresponding to a higher range of requested power level; and a second resistor in the output circuit of the first amplifier stage providing an output potential varying with current in the output circuit.

2. An amplifier for use in a fuel control system for a gas turbine engine including a control system providing an electric potential signal indicative of requested engine power level and including fuel metering means responsive to the magnitude of an electric current for regulating fuel flow to the engine, the amplifier being energized by an unregulated power source, the amplifier comprising, in combination, a first amplifier stage having a controlling potential input from the said potential signal and having a first resistor in its output circuit, effective to maintain potential across the resistor and thus current in the output circuit at a first ratio to the potential signal over a first range of operation corresponding to a lower range of requested power level; a voltage divider energized from a source of constant potential; unidirectional conducting means connecting the output circuit to the voltage divider so that the first resistor is shunted by a portion of the voltage divider above a predetermined potential across the first resistor to maintain current in the output circuit at a second and higher ratio to the potential signal over a second range of operation corresponding to a higher range of requested power level; and a second resistor in the output circuit of the first amplifier stage providing an output potential varying with current in the output circuit.

3. An amplifier for use in a fuel control system for a gas turbine engine including a control system providing an electric potential signal indicative of requested engine power level and including fuel metering means responsive to the magnitude of an electric current for regulating fuel flow to the engine, the amplifier comprising, in combination, a first amplifier stage having a controlling potential input from the said potential signal and having a first resistor in its output circuit, effective to maintain potential across the resistor and thus current in the output circuit at a first ratio to the potential signal over a first range of operation corresponding to a lower range of requested power level; a voltage divider energized from a source of constant potential; unidirectional conducting means connecting the output circuit to the voltage divider so that the first resistor is shunted by a portion of the voltage divider above a predetermined potential across the first resistor to maintain current in the output circuit at a second and higher ratio to the potential signal over a second range of operation corresponding to a higher range of requested power level; a second resistor in the output circuit of the first amplifier stage providing an output potential varying with current in the output circuit; and a current amplifier controlled by the said output potential effective to provide an output current proportional to current flow through the said resistor, the current amplifier output being adapted to control the fuel metering means.

4. An amplifier for use in a fuel control system for a gas turbine engine including a control system providing an electric potential signal indicative of requested engine power level and including fuel metering means responsive to the magnitude of an electric current for regulating fuel flow to the engine, the amplifier being energized by an unregulated power source, the amplifier comprising, in combination, a first amplifier stage having a controlling potential input from the said potential signal and having a first resistor in its output circuit, effective to maintain potential across the resistor and thus current in the output circuit at a first ratio to the potential signal over a first range of operation corresponding to a lower range of requested power level; a voltage divider energized from a source of constant potential; unidirectional conducting means connecting the output circuit to the voltage divider so that the first resistor is shunted by a portion of the voltage divider above a predetermined potential across the first resistor to maintain current in the output circuit at a second and higher ratio to the potential signal over a second range of operation corresponding to a higher range of requested power level; a second resistor in the output circuit of the first amplifier stage providing an output potential varying with current in the output circuit; and a current amplifier controlled by the said output potential effective to provide an output current proportional to current flow through the said second resistor, the current amplifier output being adapted to control the fuel metering means.

* * * * *